(12) United States Patent
Ishikawa

(10) Patent No.: US 7,178,993 B2
(45) Date of Patent: Feb. 20, 2007

(54) OPTICAL TRANSCEIVER REDUCING EMI NOISE

(75) Inventor: Manabu Ishikawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/374,107

(22) Filed: Mar. 14, 2006

(65) Prior Publication Data

US 2006/0204183 A1    Sep. 14, 2006

Related U.S. Application Data

(60) Provisional application No. 60/661,169, filed on Mar. 14, 2005.

(51) Int. Cl.
*G02B 6/36* (2006.01)
*H04B 10/00* (2006.01)

(52) U.S. Cl. .................. 385/88; 385/89; 385/92; 385/14; 398/135; 398/139

(58) Field of Classification Search ............... 385/14, 385/88, 89, 92, 93, 94, 139; 398/135, 139
See application file for complete search history.

(56) References Cited

U.S. PATENT DOCUMENTS

| 6,062,738 | A | 5/2000 | Braquet et al. ............... 385/59 |
|---|---|---|---|
| 6,200,041 | B1 | 3/2001 | Gaio et al. ..................... 385/92 |
| 6,335,869 | B1 | 1/2002 | Branch et al. ............... 361/816 |
| 7,013,088 | B1 * | 3/2006 | Jiang et al. .................. 398/139 |
| 2005/0084269 | A1 * | 4/2005 | Dallesasse et al. ......... 398/135 |
| 2005/0152701 | A1 * | 7/2005 | Liu et al. ..................... 398/135 |
| 2006/0204183 | A1 * | 9/2006 | Ishikawa ..................... 385/88 |

* cited by examiner

*Primary Examiner*—Brian M. Healy
(74) *Attorney, Agent, or Firm*—Venable LLP; Michael A. Sartori; Kavita B. Lepping

(57) ABSTRACT

The present invention provides an optical transceiver that reduces the EMI noise leaked from a portion between the receptacle body and the optical subassembly. The transceiver of the invention comprises the optical subassembly, the substrate, and the upper and lower housings. The subassembly built with the receptacle body is assembled with the housing as movable in vertical position. The assembly between the subassembly and the receptacle body is carried out by inserting the sleeve of the subassembly into the opening of the receptacle body. The cross section of the opening has an extended circular shape combined with a pair of flat portion in both sides thereof and a pair of arched portion connecting the flat portions. The interval between the flat portions is smaller than the diameter of the sleeve, while the diameter of the arched portion is greater than that of the sleeve. Since the sleeve is inserted into the opening as expanding the flat portions, not only no gap may be formed therebetween to prevent the EMI noise from leaking out but also the receptacle body may securely hold the subassembly.

10 Claims, 4 Drawing Sheets

US 7,178,993 B2

OPTICAL TRANSCEIVER REDUCING EMI NOISE

CROSS REFERENCE TO RELATED APPLICATION

The present application claims benefit of prior U.S. Provisional Application No. 60/661,169, titled by "Optical Data link having an optical receptacle body tightly assembled with optical subassemblies," filed Mar. 14, 2005.

BACKGROUND OF THE INVENTION

1. Field of the Invention

The present invention relates to an optical transceiver, in particular, relates to a new structure of the transceiver that prevents the EMI noise from leaking outward.

2. Related Prior Art

The EMI standard, which is a world wide based standard to restrict the electromagnetic radiation from the electronic components and the electronic wirings, is ruled for the electronic equipments. The optical transceiver, which is one type of the electronics equipments including an optical portion and an electrical portion, may follow this standard by covering the electronic portion with a metal cover, which is similar to the EMI shielding of the electronic equipment.

The United States patent, U.S. Pat. No. 6,200,041, has disclosed an optical transceiver that includes a metal plate inserted between the flange of the optical subassembly and the receptacle to prevent the EMI noise from leaking out of the transceiver. In other prior arts, it has been known to prevent the EMI radiation from leaking out that the package of the subassemblies may be made of metal or in the case that they are made of resin with the metal coating on whole surface thereof comes in contact to the metal housing of the transceiver.

The optical receptacle is necessary to widely open to the outside in order to mate with the optical connector. Accordingly, when a gap exists between the optical receptacle and the optical subassembly, namely, the transmitting optical subassembly (TOSA) and the receiving optical subassembly (ROSA), installed in the rear side with respect to the optical receptacle, the EMI radiation may leak from the transceiver via this gap and the opening in the optical receptacle even when the electronic portion thereof is shielded by the metal housing.

The present invention has a feature to prevent the EMI radiation from leaking out from the transceiver by a new arrangement between the receptacle and the TOSA and the ROSA, in which the gap possibly induced between these two members may be effectively filled and the TOSA and the ROSA may be securely held by the receptacle.

SUMMARY OF THE INVENTION

An optical transceiver according to the present invention comprises a receptacle body, an optical subassembly, a holder, and a substrate. The subassembly includes a sleeve portion and a body portion. The body portion installs a semiconductor optical device therein. The receptacle body may be made of resin coated with metal on surfaces thereof, and may have a rear wall and a cavity within which the sleeve portion optically couples with the optical connector that enables the optical device to communicate in optical with the optical fiber. The rear wall of the receptacle body forms an opening into which the sleeve portion is to be inserted. The substrate mounts an electronic circuit electrically communicating with the optical device in the body portion and generates an EMI noise. The housing, preferably made of electrically conductive material or made of insulating material coated with metal, covers the subassembly, the receptacle body, and the substrate.

Since the opening of the present invention has a shape that, when the sleeve portion is inserted therein, a gap inevitably induced between the outer surface of the sleeve portion and the inner surface of the opening may be disappeared by fully filling the sleeve portion. The opening may have a cross section including a pair of flat portion and a pair of arched portion connecting flat portions. An interval between the flat portions may be smaller than an outer diameter of the sleeve portion. Inserting the sleeve portion into the opening, the sleeve portion is secured within the opening as expanding the flat portions to disappear the gap therebetween. Accordingly, the EMI noise may be prevented from leaking out through the gap.

Moreover, the diameter of the arched portion may be slightly greater than the outer diameter of the sleeve portion to prevent the excess force from applying to the subassembly, which reduces the mechanical stress induced at the portion between the sleeve portion and the body portion.

Moreover, the interval between flat portions of the opening may be gradually narrower as advancing the opening deeper. The interval therebetween may be slight greater than the outer diameter of the sleeve portion at the outer surface of the receptacle body, and may be smaller than the diameter of the sleeve portion at the inner surface thereof. This configuration enables that not only the opening itself may operate as a guide for inserting but also, since the interval is slightly smaller than the diameter of the sleeve portion, the subassembly may be securely held by the receptacle body.

DESCRIPTION OF PREFERRED EMBODIMENTS

Figure 1:
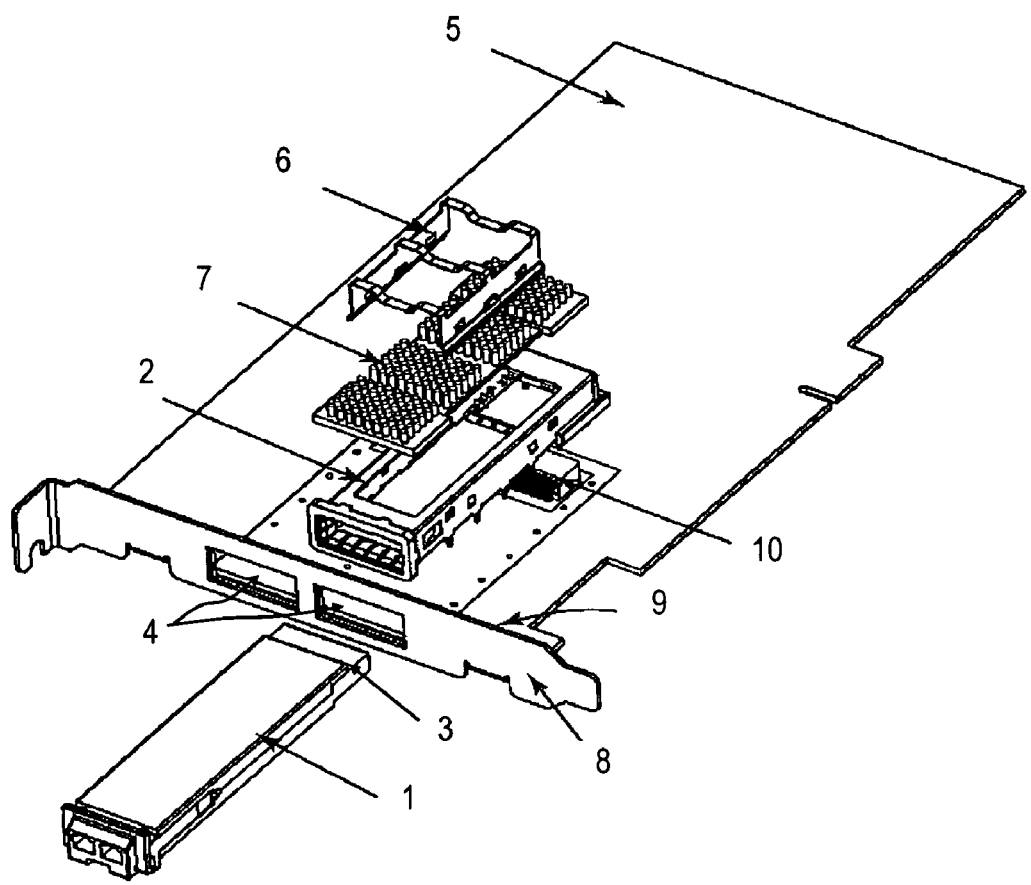
FIG. 1 shows an optical transceiver according to the present invention with the cage, the transceiver is to be inserted into, and the host system mounting the cage thereon.

Next, preferred embodiments of the present invention will be described as referring to accompanying drawings. FIG. 1 shows an optical transceiver 1 according to the present invention and a host substrate installing the optical transceiver 1 thereon, and FIG. 2 is an exploded view of the optical transceiver 1.

The optical transceiver 1 of the present invention is installed on the host system 5. FIG. 1 shows a case that the transceiver 1 is installed on a sub-board for a personal computer. On the host substrate is provided with a box-shaped cage 2 made of metal, one end of which is exposed to an opening formed in the bezel 8. In a deep end of the cage 2 5 is mounted with an electrical connector 10 on the host substrate, which is to be mated with an electrical plug 3 formed in the rear end of the transceiver 1 by inserting it into the cage 2, which enables to communicate the transceiver 1 with the host system 5. Above the cage 2 is set with a heat dissipating fin 7 and a clip 6 to bundle the fin 7 with the cage 2. Moreover, in order to fill a gap between the cage 2 and the bezel 8, a shield gasket 9, which is not appeared in FIG. 1, is set in the side of the host system 5 so as to surround the opening 4 in the bezel 8. Although FIG. 1 arranges the cage 2 only in the right opening 4 of the bezel 8, the left opening 4 also provides the cage 2 in practical.

The optical transceiver 1 in FIG. 1 has the so-called XFP type. The front end of the transceiver 1 juxtaposes two openings 1a. When the transceiver 1 is inserted into the cage 2 and the electrical connection therebetween is established, it is preferable that the plug 3 of the transceiver 1 is hard to disengage with the connector 10 on the host substrate 5. Accordingly, a mechanism to latch the transceiver 1 once inserted into the cage 2 is formed in the transceiver 1. This latching mechanism prevents, by engaging with the opening formed in the sides of the cage, the transceiver 1 from releasing therefrom. However, the transceiver 1 itself is necessary to be released from the cage 2 because of, for example, the replacement. To rotate the bail 17 in front of the receptacle around an axis provided in the side thereof may disengage this latching to release the transceiver 1 from the cage 2.

Figure 2:
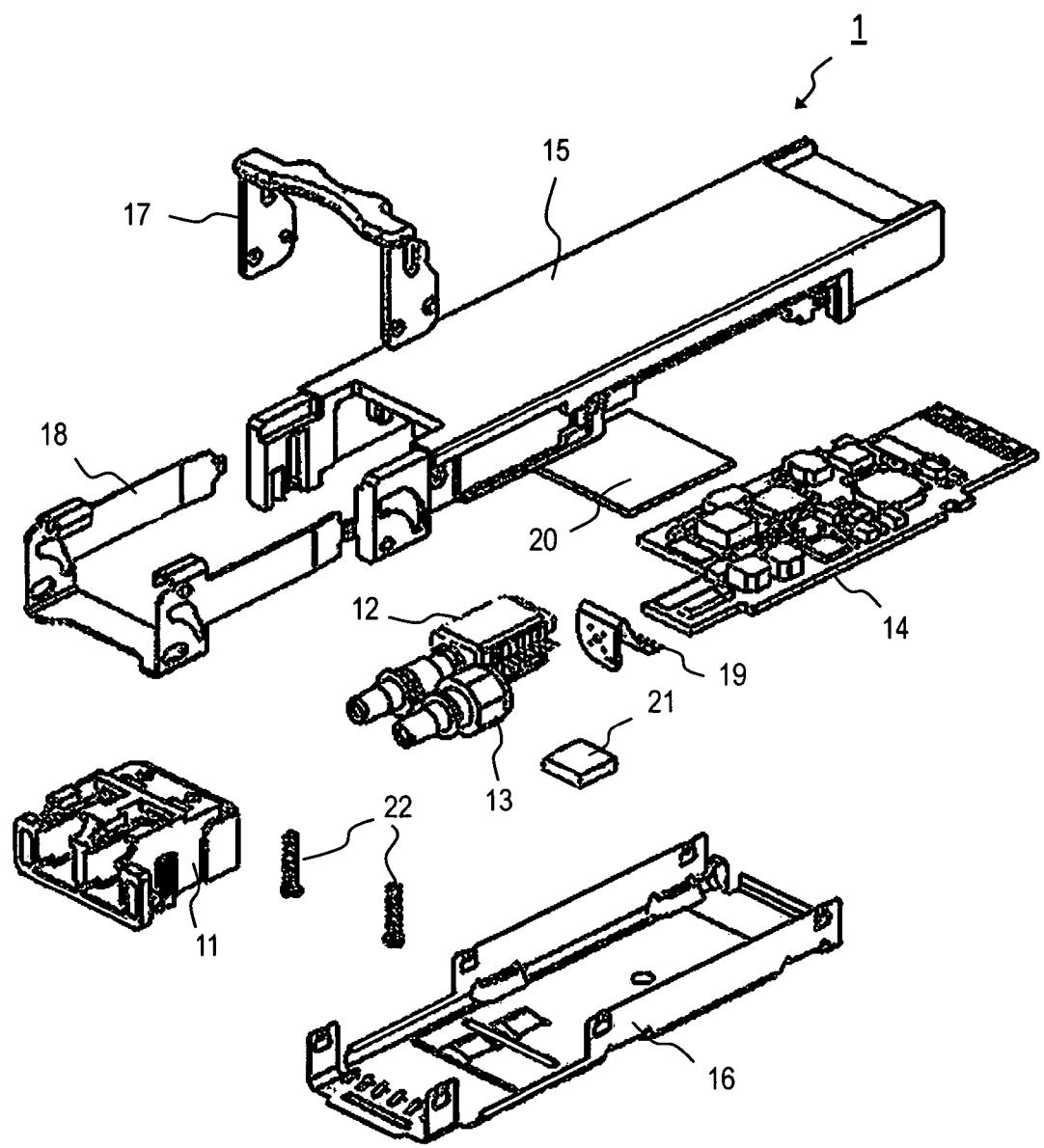
FIG. 2 is an exploded view of the optical transceiver according to the present invention.

FIG. 2 is an exploded view of the transceiver 1 that roughly comprises a receptacle body 11, optical subassemblies, 12 and 13, a substrate 14 for mounting an electronic circuit, an upper housing 15, a lower housing 16, an actuator 18, and a bail 17. The receptacle body 11 is made of resin whose surfaces are coated with metal, while the upper housing 15, the lower housing 16, the bail 17, and the actuator 18 are, in the present embodiment, made of metal, in particular, the upper housing is formed by the metal die-casting. The receiving optical subassembly (ROSA) 13 has a co-axial package, while the transmitting optical sub-assembly (TOSA) 12, although a sleeve portion thereof has a co-axial shape, adopts the so-called butterfly package with a box-shaped configuration for the body portion within which an optical device, such as light-emitting device, is installed. A flexible printed circuit (FPC) board 19 connects the ROSA 13 to the substrate 14, while a plurality of lead pins connects the TOSA 12 to the substrate 14. Moreover, a thermal sheet 20 and a thermal block 21 are provided for dissipating heat generated by the electronic circuit on the substrate to the upper and lower housings, 15 and 16.

As already explained, the bail 17 and the actuator 18 perform the function to prevent the transceiver from easily releasing from the cage 2 after inserting it into the cage 2, and to release the transceiver from the cage 2 by sliding the actuator 18 in connection with the rotation of the bail 17. The bail 17 and the actuator 18 are assembled in the front side wall of the upper housing 15.

The receptacle body 11 forms two openings in the front end thereof. By mating the optical connector into these openings, semiconductor optical devices each installed within the TOSA 12 and the ROSA 13 may optically couple with the optical fiber. The openings have a function of the optical receptacle, dimensions and the shape thereof fully following the specification of the optical connector. The TOSA 12 and the ROSA 13 are assembled in the rear end of the receptacle body 11. As explained later, by inserting the sleeve formed in the front side of the TOSA 12 and the ROSA 13 into the opening formed in the rear wall of the receptacle body 11, the positional relation of the TOSA 12 and the ROSA 13 may be automatically decided against the upper housing 15.

When the receptacle body 11 and the upper housing 15 are integrally made of resin, even if the position of the TOSA 12 and the ROSA 13 are defined with respect to the receptacle body 11, the body portion of the TOSA 12 or the ROSA 13, in particular, the portion of the TOSA 12 having the box shape, is not always ensured to be in the optimal position, or in the designed position, against the upper housing 15. Only the sleeve portion is defined with respect to the receptacle body 11, the body portion thereof is not defined.

Moreover, the dimensional accuracy between the sleeve portion and the body portion is scattered in individual TOSAs to get the good optical coupling therebetween by adjusting the sleeve portion to the body portion. Therefore, even if the sleeve portion of the TOSA 12 is aligned and fixed to the receptacle body 11, the upper surface of the body portion, which becomes the heat dissipating path, does not always fit to the ceiling of the upper housing 15. To adhere the upper surface of the body portion to the upper housing 15 may secure the heat dissipating path from the TOSA 12 to the upper housing 15, while, the unsecured contact therebetween may cause the degradation in the reliability of the devices installed within the body portion. When the upper surface of the body portion is forced to fit to the upper housing 15, mechanical stress may be induced in a point connecting the sleeve portion to the body portion, or may misalign the optical axis between the sleeve and the device within the body portion.

Accordingly, the transceiver 1 of the present invention has the receptacle body 11 independent of the upper housing 15, and the receptacle body 11 is assembled with the upper housing 15 after the TOSA 12 and the ROSA 13 aligns with the receptacle body 11, which may be called as a floating receptacle structure. The receptacle body 11 is fixed to the upper housing 15 by screws 22 as adjusting the vertical position thereof after the TOSA 12 and the ROSA 13 are built with. The screw hole in the receptacle body 11 and those in the inner surface of the side wall of the upper housing 15 initially have no thread. The arrangement that secures the whole contact between the upper surface of the body portion and the ceiling of the upper housing 15 under the condition such that the optical coupling between the sleeve and the device in the body portion is not affected can be realized by cutting the thread with the screw itself as monitoring the gap between the upper surface of the body portion and the upper housing 15 when the screw is first inserted into the hole.

Next, the assembly of the receptacle body 11 with the TOSA 12 and the ROSA 13 is described in detail as referring to drawings.

Figure 3A:
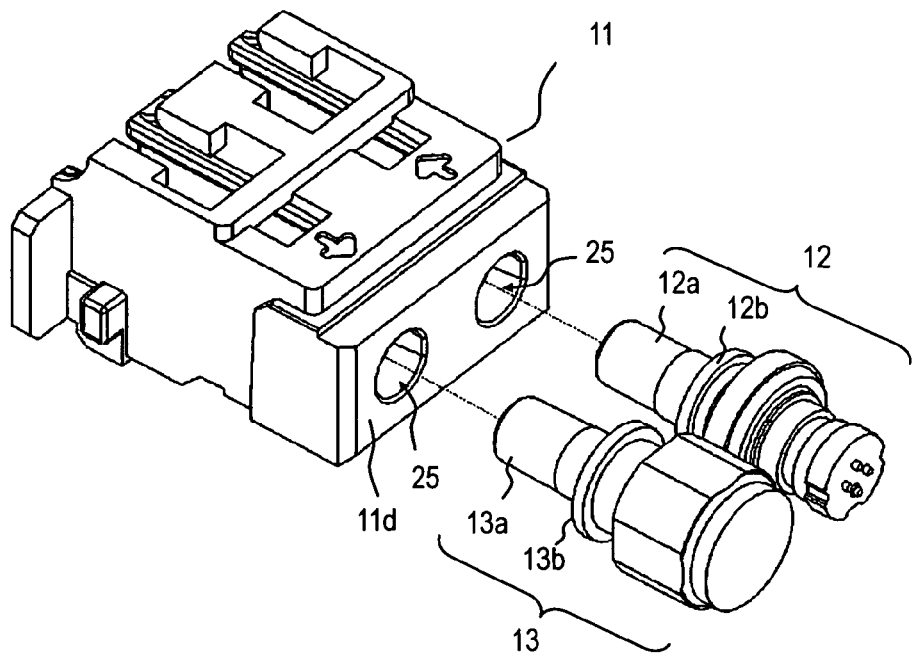
FIG. 3A is a perspective view showing the process for assembling the TOSA and the ROSA with the receptacle body.
Figure 3B:
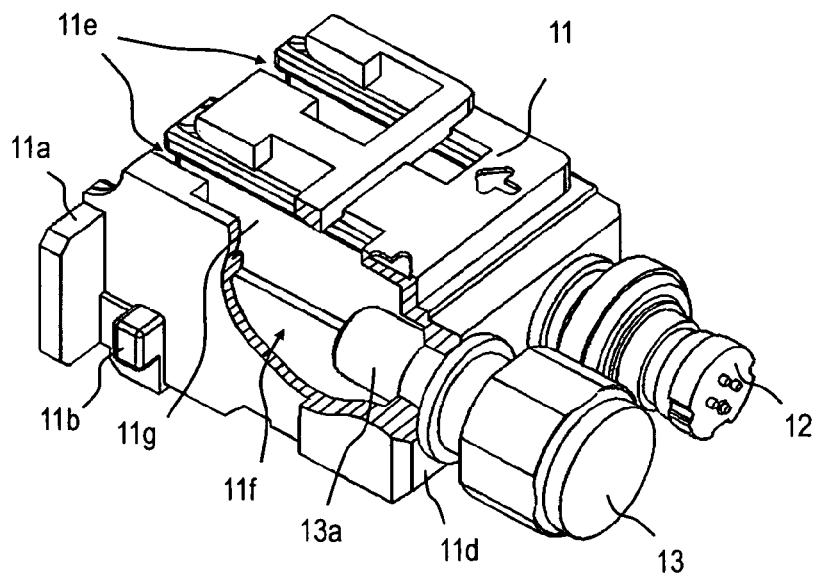
FIG. 3B is the partially broke perspective view of the receptacle body assembled with the TOSA and the ROSA.

FIG. 3A shows a process that the sleeves of the TOSA 12 and the ROSA 13 are inserted into an opening formed in the rear wall of the receptacle body 11, FIG. 3B shows the receptacle body 11 assembled with the TOSA 12 and the ROSA 13. As shown in these figures, the sleeves, 12a and 13a, of the TOSA 12 and the ROSA 13 are inserted into the opening 25 until the flanges, 12b and 13b, formed in a middle of the sleeve come in contact to the rear wall of the receptacle body 11. As described in later in this specification, the opening 25 has an extended circle with a pair of flat portions 25b facing each other and an interval between these flat portions 25b being slightly smaller than an outer diameter of the sleeve. Moreover, the interval is preferable to be gradually narrower as advancing the opening 25 deeper. While, portions 25a of the opening 25 connecting the flat portions 25b have an arched shape with a radius thereof equal to or slightly larger than the outer radius of the sleeves, 12a and 13a.

The tips of the sleeves, 12a and 13a, protrudes into cavities 11f, which is partitioned by the center partition 11g, and to be mated with the ferrule attached to the optical connector in the cavity 11f. The protruding length of the sleeves, 12a and 13a, into the cavity 11f may be determined by the length of the sleeve from the tip thereof to the flanges, 12b and 13b, and the thickness of the rear wall 11d of the receptacle body 11. This protruding length is necessary to follow the standard of the optical connector.

In the rear side of the TOSA 12 and the ROSA 13 is installed with the substrate 14, the electronic circuit communicating with the TOSA 12 and the ROSA 13 is mounted thereon. The upper and lower housings, 15 and 16, which provide with the heat dissipating mechanism, cover the TOSA 12 and the ROSA 13 and the substrate 14; thus completes the optical transceiver 1. The housings, 15 and 16, are assembled with the rear end of the receptacle body 11 such that they expose the front side of the receptacle body 11. In FIGS. 3A and 3B, the TOSA 12 also has the co-axial shape, which is same with the ROSA 13. The receptacle body 11 of the present embodiment is preferable to be made of resin with the metal coating on whole surface thereof. The structures appeared in the front side of the receptacle body 11, for example, the flange 11a and the projection 11b, are formed to assemble this receptacle body 11 with the upper housing 15.

The upper surface of the receptacle body 11 forms a cutting 11e extending from the edge thereof to the center of the cavity 11f to receive the releasing mechanism provided in the optical connector. For the explanation sake, the upper surface of the receptacle body 11 corresponds to the surface explicitly illustrated in FIG. 3A, and the front side of the receptacle body 11, or that of the transceiver 1, corresponds to a side to be mated with the optical connector. On both sides of the front end of the receptacle body 11 are formed with a pair of flanges 11a that covers the front end of the upper housing 15.

Figure 4A:
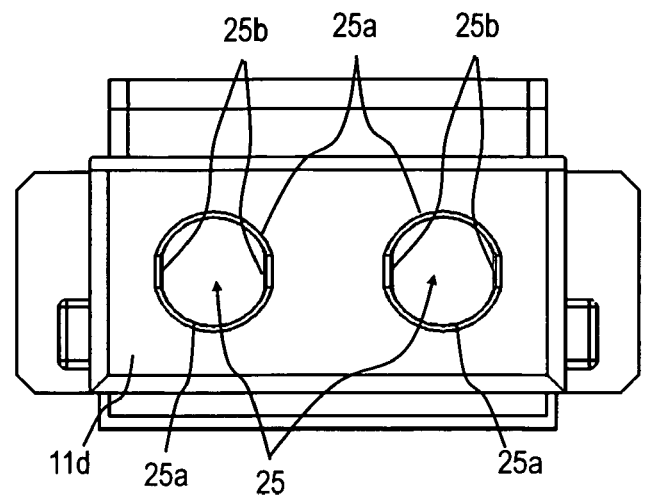
FIG. 4A is a back view of the receptacle body and FIG. 4B is a horizontal sectional view of the receptacle body.

FIG. 4A is a rear view of the receptacle body 11. As explicitly shown in FIG. 4A, the cross section of the opening 25 formed in the rear wall of the receptacle body 11 for inserting the sleeves of the TOSA 12 and the ROSA 13 thereinto have the extended circular shape. Both sides of this extended circle have the flat portions 25b. By narrowing the interval between these flat portions 25b smaller than the outer diameter of the sleeves, 12a and 13a, these portions 25b may be widened when the sleeves, 12a and 13a, are inserted therein, which means that the receptacle body 11 securely holds the TOSA 12 and the ROSA 13.

Here, the receptacle body 11 may be made of resin with the metal coating, while the sleeves, 12a and 13a, may be made of metal, accordingly, the sleeves, 12a and 13a, are hard to be deformed as the insertion into the openings 25. The expansion of the openings 25 becomes dominate. Moreover, the radius of the arched portion 25a that connects the pair of flat portions 25b is preferably greater than that of the sleeve. In the case that the radius of the arched portion 25a is smaller than that of the sleeve, an excess force may be applied at the insertion, which may cause a mechanical stress in the connecting portion between the sleeve and the body portion, or, in an extreme case, the press fitting itself becomes impossible.

Figure 4B:
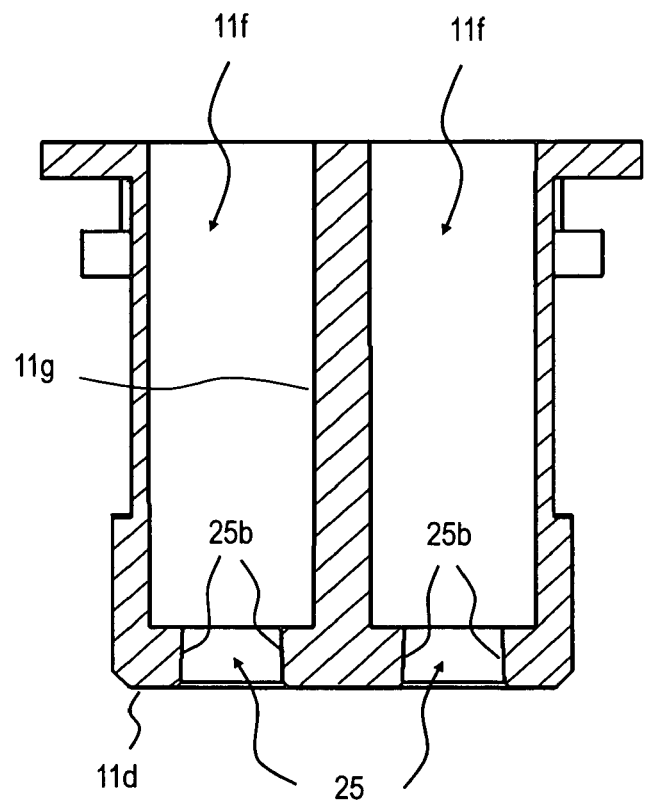

FIG. 4B is a horizontal cross section of the receptacle body 11. In FIG. 4B, the upper side corresponds to the front side of the transceiver, while the lower thereof corresponds to the rear. Two cavities 11f extends from the opening provided in the front end to the rear wall 11d of the receptacle body 11. The front end of the receptacle body 11 forms the flange 11a in both sides thereof, and the rear wall 11d thereof forms the pair of openings 25. As a second feature according to the present invention, the size of the opening 25 gradually narrows as getting close to the cavity, that is, the opening 25 has a tapered cross section as shown in FIG. 4B.

For this tapered shape of the opening 25, the width thereof is 3.01±0.01 mm at the surface of the rear wall 11d, which is greater than the diameter of the sleeve, 3.00+0.02/−0.00 mm, while the width is set to be 2.95±0.01 mm at the inner surface of the rear wall 11d. Accordingly, the opening 25 is expanded by (3.00−2.95)/2 ~0.025 mm, under the minimum situation (2.98−2.96)/2=0.01 mm, which secures to hold the sleeves, 12a and 13a, with a moderate force, and because the gap between the outer surface of the sleeves, 12a and 13a, and the inner surface of the opening 25 may be filled, the EMI noise generated within the transceiver 1 can be prevented from leaking out.

Thus, the present invention is described as referring to preferred embodiments. Although the description above is based on the configuration that the TOSA 12 and the ROSA 13 have the so-called co-axial package, the package is not restricted to those shapes as long as the shape of the opening in the rear wall of the receptacle body. Practically, FIG. 2 shows the transceiver that installs the subassembly with the box shaped package. Accordingly, the present invention may be applicable to such subassemblies with the box-shaped package.

What is claimed is:

1. An optical transceiver mating with an optical connector, comprising:

an optical subassembly including a sleeve portion and a body portion connected to the sleeve portion, the body portion installing a semiconductor optical device optically coupled with the optical connector;

a receptacle body made of electrically conductive material, the receptacle body includes an opening with an inner surface and a cavity, the opening being configured to connect the cavity to an outer surface of the receptacle body and to receive the sleeve portion of the optical subassembly such that the sleeve portion optically couples with the optical connector within the cavity;

a substrate for mounting an electronic circuit electrically coupled with the optical subassembly, the electronic circuit radiating an EMI radiation; and a housing made of electrically conductive material, the housing covering the optical subassembly and the substrate, wherein the opening has a shape such that a gap between the sleeve portion and an inner surface thereof disappears as inserting the sleeve portion into the opening by being filled with the sleeve portion.

2. The optical transceiver according to claim 1, wherein the opening has a cross section including a pair of flat portion and a pair of arched portion connecting flat portions, an interval between the flat portions is smaller than an outer diameter of the sleeve portion.

3. The optical transceiver according to claim 2, wherein a diameter of the arched portion is greater than the outer diameter of the sleeve portion.

4. The optical transceiver according to claim 2, wherein the interval between the flat portions is gradually narrower as advancing the opening deeper.

5. The optical transceiver according to claim 4,
wherein the interval between the flat portions is greater than the diameter of the sleeve portion at an outer surface of the receptacle body, and is smaller than the diameter of the sleeve portion at an inner surface of the receptacle body.

6. The optical transceiver according to claim 1,
wherein the sleeve portion is made of metal.

7. The optical transceiver according to claim 1,
wherein the sleeve portion is made of resin coated with metal.

8. The optical transceiver according to claim 1,
wherein the receptacle body is made of resin coated with meal.

9. The optical transceiver according to claim 1,
wherein the housing is made of metal.

10. The optical transceiver according to clam 1,
wherein the housing is made of resin coated with metal.

* * * * *